United States Patent
Wang et al.

(10) Patent No.: US 11,216,075 B2
(45) Date of Patent: Jan. 4, 2022

(54) METHOD, APPARATUS AND DEVICE FOR TRIGGERING SHOOTING MODE, AND STORAGE MEDIUM

(71) Applicant: BEIJING XIAOMI MOBILE SOFTWARE CO., LTD., Beijing (CN)

(72) Inventors: Qian Wang, Beijing (CN); Yuhang Liang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/863,930

(22) Filed: Apr. 30, 2020

(65) Prior Publication Data
US 2021/0149497 A1 May 20, 2021

(30) Foreign Application Priority Data
Nov. 15, 2019 (CN) .......................... 201911122556.7

(51) Int. Cl.
| | | |
|---|---|---|
| G06F 3/01 | (2006.01) | |
| H04N 5/232 | (2006.01) | |
| G06F 3/00 | (2006.01) | |
| G06N 20/00 | (2019.01) | |
| G06F 3/03 | (2006.01) | |

(52) U.S. Cl.
CPC .............. G06F 3/017 (2013.01); G06F 3/005 (2013.01); H04N 5/23203 (2013.01); H04N 5/23219 (2013.01); H04N 5/23245 (2013.01); G06F 3/0304 (2013.01); G06N 20/00 (2019.01)

(58) Field of Classification Search
CPC ........ G06F 3/017; G06F 3/005; G06F 3/0304; H04N 5/23203; H04N 5/23218–23219; H04N 5/23293; H04N 5/232933; H04N 5/23216; H04N 5/23245; H04N 5/23219
See application file for complete search history.

(56) References Cited

U.S. PATENT DOCUMENTS

| | | | | |
|---|---|---|---|---|
| 2012/0242853 A1* | 9/2012 | Jasinski | ............. | H04N 5/23245 348/222.1 |
| 2013/0141524 A1* | 6/2013 | Karunamuni | .... | H04N 5/232933 348/38 |
| 2013/0271618 A1 | 10/2013 | Koryakovskiy et al. | | |
| 2014/0043232 A1* | 2/2014 | Kurokawa | ............ | G06F 3/0304 345/156 |
| 2014/0240213 A1* | 8/2014 | Alaniz | ..................... | G06F 3/017 345/156 |
| 2015/0229837 A1* | 8/2015 | Her | ..................... | H04N 5/23218 348/222.1 |

(Continued)

FOREIGN PATENT DOCUMENTS

| | | |
|---|---|---|
| CN | 108650457 A | 10/2018 |
| CN | 108989679 A | 12/2018 |

(Continued)

OTHER PUBLICATIONS

Extended European Search Report of counterpart EP Application No. 20178041.8 dated Nov. 13, 2020, (8p).

*Primary Examiner* — Xuemei Zheng
(74) *Attorney, Agent, or Firm* — Arch & Lake LLP

(57) ABSTRACT

A method, an apparatus and a device are provided for triggering a shooting mode, and a storage medium, and belongs to the field of man-machine interaction. The method includes: acquiring a shooting preview image; recognizing gesture information in the shooting preview image; and triggering a shooting mode corresponding to a number characterized by the gesture information when the gesture information is gesture information characterizing the number.

13 Claims, 11 Drawing Sheets

(a)

(b)

(56) References Cited

U.S. PATENT DOCUMENTS

2019/0138110 A1   5/2019  Choi et al.
2019/0200089 A1*  6/2019  Pio .................. H04N 21/47217
2020/0257436 A1   8/2020  Yun et al.

FOREIGN PATENT DOCUMENTS

| CN | 109218612 A | 1/2019 |
| KR | 20160049413 A | 5/2016 |
| WO | 2019027090 A1 | 2/2019 |

* cited by examiner (a)          (b)          (c)

(a)

(b)

(c)

(d)

(a)

(b)

(c)

(d)

(a)  (b)

(c)  (d)

(a) (b)

(a)          (b)

METHOD, APPARATUS AND DEVICE FOR TRIGGERING SHOOTING MODE, AND STORAGE MEDIUM

CROSS-REFERENCE TO RELATED APPLICATION

This application claims priority to Chinese Patent Application 201911122556.7, filed Nov. 15, 2019, the disclosure of which is hereby incorporated by reference in its entirety.

TECHNICAL FIELD

The present disclosure relates to the field of man-machine interaction, and more particularly to a method, an apparatus and a device for triggering a shooting mode, and a storage medium.

BACKGROUND

Gesture recognition refers to recognize a gesture of a user with a mathematical algorithm, so that the user may control or interact with a computer only through simple gesture without touching the computer. The gesture recognition includes static gesture recognition and dynamic gesture recognition, where the dynamic gesture recognition may be converted into a sequence of static gesture images.

SUMMARY

Embodiments of the present disclosure provide a method, an apparatus, a device for triggering a shooting mode, and a storage medium. The technical solutions are as follows.

According to one aspect of the present disclosure, a method for triggering a shooting mode is provided. The method includes: acquiring a shooting preview image; recognizing gesture information in the shooting preview image; and triggering a shooting mode corresponding to a number characterized by the gesture information when the gesture information is gesture information characterizing the number.

According to another aspect of the present disclosure, an apparatus for triggering a shooting mode is provided. The apparatus includes: a processor; and a memory for storing instructions executable by the processor. The processor is configured to: acquire a shooting preview image; recognize gesture information in the shooting preview image; and trigger a shooting mode corresponding to a number characterized by the gesture information when the gesture information is gesture information characterizing the number.

According to another aspect of the present disclosure, a computer device is provided. The computer device includes a processor and a memory, wherein at least one instruction, at least one program, a code set or an instruction set is stored in the memory, the at least one instruction, the at least one program, the code set or the instruction set is loaded and executed by the processor to perform followings acts: acquiring a shooting preview image; recognizing gesture information in the shooting preview image; and triggering a shooting mode corresponding to a number characterized by the gesture information when the gesture information is gesture information characterizing the number.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

First, terms involved in the embodiments of the present disclosure are introduced.

Gesture recognition: it refers to the use of gestures as control instructions to control a terminal to complete specific tasks. For example, by waving a hand (similar to a "goodbye" gesture), the terminal used by a user can be switched from a screen-off mode to a screen-on mode; or, the user unlocks the terminal with a swipe gesture in a gesture interaction interface. Optionally, the gesture recognition may be enabled based on three methods including an algorithm, a neural network, and a sample gesture library. For example, when a gesture detected by the terminal matches a preset gesture, the terminal may complete a corresponding task (such as, closing an application, inputting a text, etc.) according to the gesture. In the embodiments of the present disclosure, a shooting application of the terminal can be controlled with a gesture to trigger different shooting modes. The embodiment below is illustrated using a smart phone as the terminal by way of example.

Figure 1:
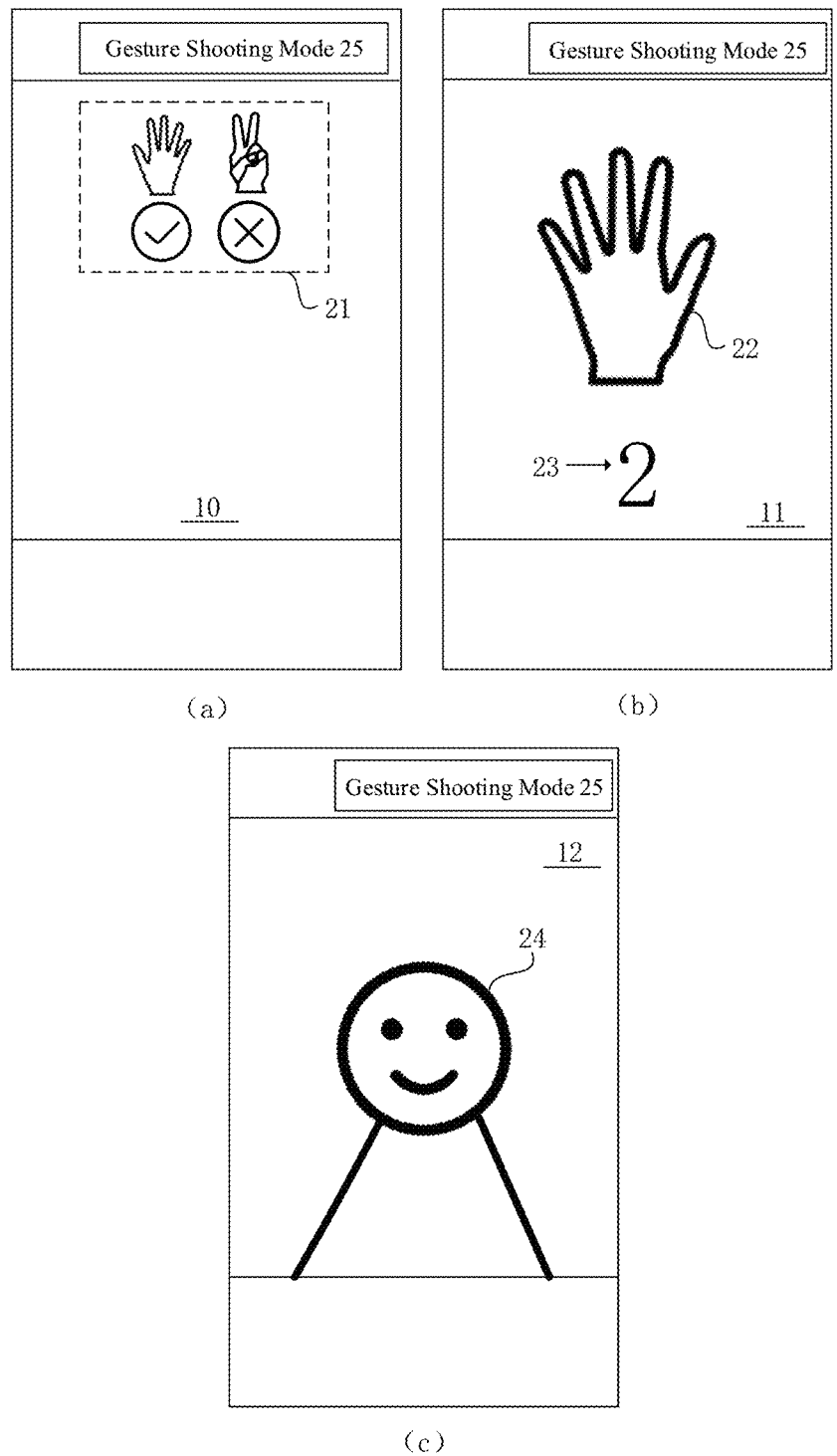
FIG. 1 is a schematic diagram of an interface for acquiring an image through gesture information in a related art.

FIG. 1 illustrates a schematic diagram of an interface for acquiring an image in a related art.

As illustrated in FIG. 1(a), a gesture prompt sign 21 and a gesture Shooting Mode 25 are displayed on an interface 10. Optionally, the interface 10 is a shooting interface to control a camera, or an interface corresponding to a display region of a display screen. The gesture prompt sign 21 is an example for prompting the user to use the gesture correctly. For example, in the gesture Shooting Mode 25, spreading out five fingers is a recognizable gesture; and a gesture corresponding to stretching out index and middle fingers, i.e. a V-shaped gesture, is an unrecognizable gesture. When a front camera of the smart phone recognizes that the gesture made by the user is the gesture corresponding to spreading out the five fingers, the smart phone can be controlled to shoot photos according to this gesture; and when the front camera of the smart phone recognizes that the gesture made by the user is the V-shaped gesture, the smart phone cannot be controlled to shoot according to this gesture.

As illustrated in FIG. 1(b), a gesture of the user 22, a countdown sign 23, and a gesture shooting mode 25 are displayed on the interface 11. The user makes the corresponding gesture 22 according to the gesture prompt sign 21. Optionally, the gesture 22 is made with a left or right hand of the user, with a palm of the hand facing the interface 11, or a back of the hand facing the interface 11. Optionally, the gesture 22 is a static gesture, that is, no movement occurs in the interface 11, or a movement distance does not exceed a threshold. After the smart phone successfully recognizes the gesture 22, the countdown sign 23 is displayed on the interface 11; and after the countdown ends, a screen in the interface 11 is captured, as illustrated in FIG. 1(c). A shot user image is displayed on the interface 12, which is automatically shot by the smart phone after the countdown ends.

In the method for acquiring the image according to the embodiment above, a user may capture an image only with a specific gesture, and in only one shooting mode which is low in utilization.

An embodiment of the present disclosure provides a method for triggering a shooting mode, where the terminal is triggered to enter different shooting modes when the user makes different gestures. The method provided in this embodiment of the present disclosure can be applied to a terminal having a camera shooting function, such as a mobile phone, a tablet computer, a notebook computer, a desktop computer and the like. The embodiment of the present disclosure is illustrated using a smart phone as the terminal by way of example.

Figure 2:
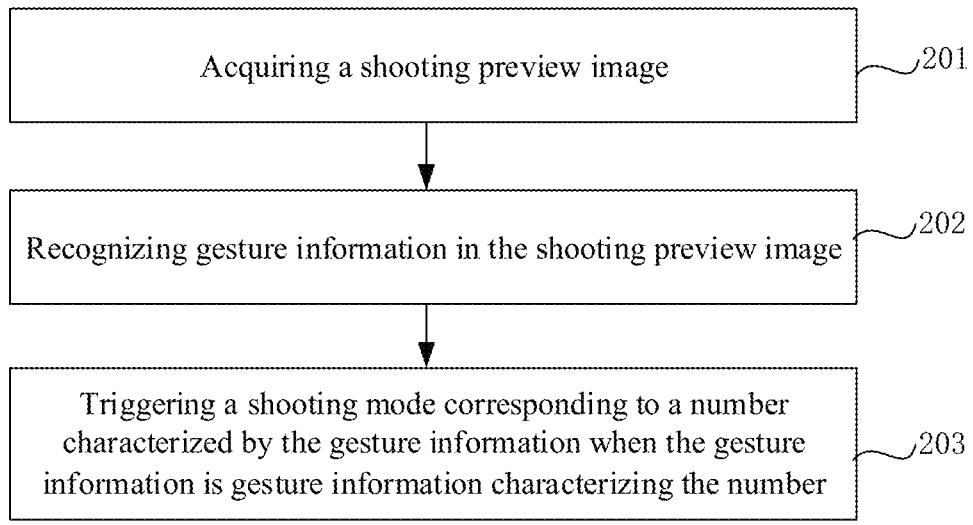
FIG. 2 is a flowchart of a method for triggering a shooting mode according to an example of the present disclosure.

FIG. 2 illustrates a flowchart of a method for triggering a shooting mode according to an example of the present disclosure. The method may be applied to an application supporting a camera shooting function in a terminal, or to a device having a camera shooting function. The method includes the following steps.

In step 201, a shooting preview image is acquired. The shooting preview image may be obtained by the camera in the terminal.

The application supporting the camera shooting function or the device having the camera shooting function acquires the shooting preview image.

The shooting preview image refers to an image corresponding to a preview screen displayed by the camera before shooting. The method in this embodiment of the present disclosure can be applied to an application supporting a camera shooting function in a terminal, such as a camera application in a smart phone, or to a device having a camera shooting function, such as a digital single lens reflex camera, a sports camera, etc. Optionally, the shooting preview image is acquired by the camera of the terminal, or by calling the camera of the terminal via an application. The application is an application having the camera shooting function, such as an application corresponding to the camera in the terminal, or an application supporting the camera shooting functions, such as a social application, a payment application, a shopping application, etc. Optionally, when the terminal is a smart phone, the shooting preview image is an image acquired by a front camera of the smart phone, or an image acquired by a rear camera of the smart phone.

Optionally, the shooting preview image is a static image or a dynamic image. The static image refers to a photo, a picture and other images, and the dynamic image includes a video, a dynamic emotion image and other images.

In step 202, gesture information in the shooting preview image is recognized.

A chip in a terminal or in a device having the camera shooting function recognizes the gesture information in the shooting preview image.

Optionally, the gesture information in the shooting preview image is recognized in at least one of the following manners: recognizing the gesture information based on a neural network, recognizing the gesture information based on a mathematical algorithm, and recognizing the gesture information based on an established a sample gesture library. For example, the gesture information is recognized by writing a code about recognizing the gesture information; the code includes a gesture algorithm for recognizing a specific gesture; or, a gesture in the acquired gesture information is compared with a sample gesture in the sample gesture library, thereby determining whether the gesture in the gesture information is consistent with the gesture in the sample gesture library.

In the embodiment of the present disclosure, the gesture information in the shooting preview image is recognized based on the neural network by way of example. For example, the gesture information is recognized by calling a gesture recognition model that is built based on the neural network.

The gesture information refers to feature information carried in a gesture made by the user. Optionally, the gestures included in the gesture information are static or dynamic. For example, a victory gesture (i.e. the V-shaped gesture) made by the user is a static gesture, and the gesture of waving a hand made by the user is a dynamic gesture.

In step 203, a shooting mode corresponding to a number characterized by the gesture information is triggered when the terminal determines that the gesture information characterizes the number.

When determining that the gesture information characterizes or indicates the number, the chip in the terminal or in the device having the camera shooting function controls the terminal or the device having the camera shooting function to trigger a shooting mode corresponding to the number characterized by the gesture information.

Each gesture corresponds to a certain gesture information. The gesture information characterizing a number refers to that a gesture made by the user carries information indicating the number. For example, the gesture indicating victory (i.e. the V-shaped gesture) made by the user carries information indicating the number of two. The number characterized by the gesture information refers to the number represented by the gesture made by the user, which is subject to the number of fingers stretched out by the user. For example, when the user makes a gesture of opening the palm, that is, when the user stretches out five fingers, a number characterized by the gesture information corresponding to the gesture is five.

The shooting mode includes at least one of the following shooting modes: an automatic shooting mode, a panorama shooting mode, a high dynamic range imaging mode, a night shooting mode, a macro shooting mode, a grid shooting mode, a portrait shooting mode, a slow-motion shooting mode, and a time-lapse shooting mode.

The automatic shooting mode refers to an application supporting a camera shooting function in a terminal or a device having a camera shooting function adjusts shooting parameters automatically according to a current shooting environment. The panorama shooting mode refers to an application supporting a camera shooting function in a terminal or a device having a camera shooting function stitches multiple photos taken continuously into one photo, which may expand the visual angle of the image.

The high dynamic range imaging mode, i.e. the HDR mode refers to the camera can automatically shoot three images of underexposure, normal exposure and overexposure continuously, and an application supporting a camera shooting function in a terminal or a device having a camera shooting function selects the best part of each image to combine into one image. The night shooting mode refers to when a camera shoots in the condition of inadequate light, an application supporting a camera shooting function in a terminal or a device having a camera shooting function may control the noise in the screen and increase the brightness of the screen. The macro shooting mode refers to when a camera shoots a close-up object, an application supporting a camera shooting function in a terminal or a device having a camera shooting function may blur out the background of the object to highlight the subject.

The grid shooting mode refers to an application supporting a camera shooting function in a terminal or a device having a camera shooting function may stitch shot images into a grid image, and the image in each grid may be the same or different. The portrait shooting mode refers to an application supporting a camera shooting function in a terminal or a device having a camera shooting function adjusts shooting parameters to those suitable for shooting characters. The slow-motion shooting mode refers to a camera shoots an image at a high shooting frame rate, and presents the image at a low video frame rate when the user views the image. The time-lapse shooting mode refers to a camera shoots a photo at set intervals, and an application supporting a camera shooting function or a device having a camera shooting function combines the shot photos into a video which is played at a non-standard rate.

In an example, the user makes a gesture of spreading out the palm, where the number characterized by this gesture information is five. When the user makes the gesture of spreading out the palm in front of the camera of the terminal, the application corresponding to the camera is triggered to enter a shooting mode corresponding to the number of five. For example, the application corresponding to the camera enters a five grid shooting mode.

In summary, according to the method provided in the embodiment, by recognizing the gesture information in the shooting preview image, the shooting mode corresponding to the number characterized by the gesture information is triggered when determining that the gesture information characterizes the number. For example, in case that the number characterized by the gesture information is five, the shooting mode of a five grid is triggered. Therefore, a user can trigger different shooting modes by making different gestures, which enriches the shooting mode for the user and improves the efficiency of the man-machine interaction.

Figure 3:
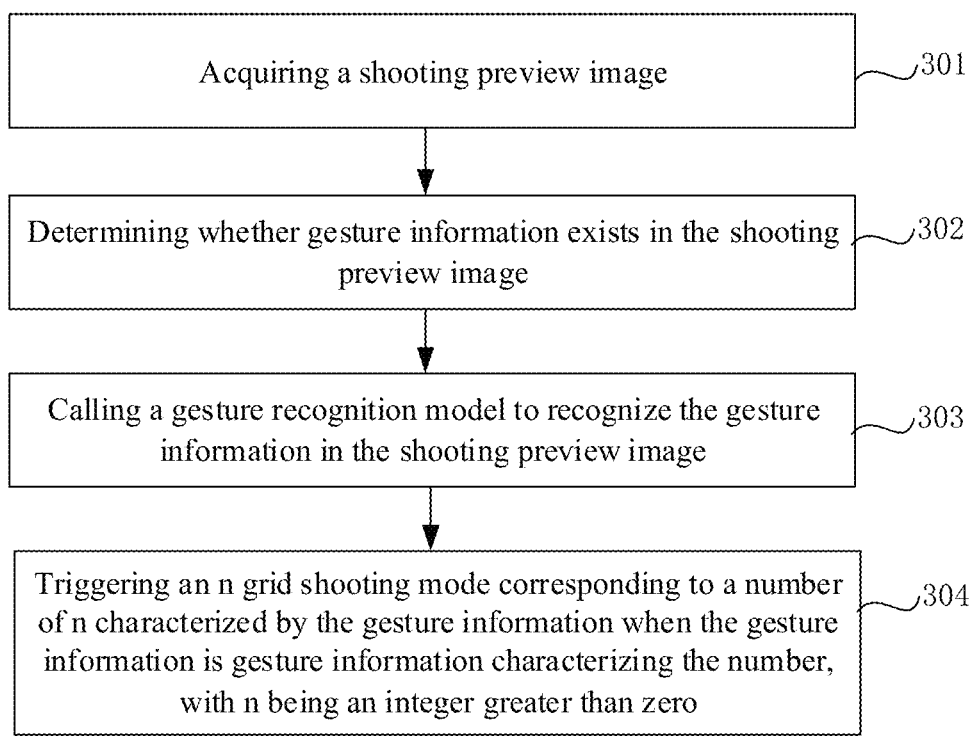
FIG. 3 is a flowchart of a method for triggering a shooting mode according to another example of the present disclosure.

FIG. 3 illustrates a flowchart of a method for triggering a shooting mode according to another example of the present disclosure. The method may be applied to an application supporting a camera shooting function in a terminal, or to an electronic device having a camera shooting function. The method includes the following steps.

In step 301, a shooting preview image is acquired.

The application supporting the camera shooting function or the device having the camera shooting function acquires the shooting preview image.

In an example, the shooting preview image is acquired by an application corresponding to a camera in a smart phone, where the shooting preview image is a dynamic image and is acquired through a front camera of the smart phone.

In step 302, whether gesture information exists in the shooting preview image is determined.

A chip in the terminal or in the device having the camera shooting function determines whether the gesture information exists in the shooting preview image.

The smart phone determines whether the gesture information exists in the shooting preview image, and recognizes the gesture information when the gesture information exists in the shooting preview image.

In step 303, a gesture recognition model is called to recognize the gesture information in the shooting preview image, wherein the gesture recognition model is a machine learning model with a gesture recognition capability. The gesture recognition model may be used to determine the number characterized by the gesture.

The chip in the terminal or in the device having the camera shooting function calls the gesture recognition model to recognize the gesture information in the shooting preview image, wherein the gesture recognition model is a machine learning model with the gesture recognition capability.

Optionally, the gesture recognition model refers to one or more models. When the gesture recognition model refers to multiple models, the multiple gesture recognition models may be the same model, or different models, or different models in the same type of model.

Optionally, the gesture recognition model is trained by the following steps.

In step 3031, at least one set of sample gesture information and the number of sample gesture information representations.

Optionally, the sample gesture information which is a static image may be acquired by establishing a sample gesture library. Optionally, the sample gesture information may be a gesture image corresponding to the palm of the hand, or a gesture image corresponding to the back of the hand, may be a gesture image corresponding to any angle, may also be a gesture image captured in any light, may be a gesture image with or without a jewelry. Optionally, the number characterized by the sample gesture information may be calibrated manually, or by other gesture recognition models.

In step 3032, the sample gesture information is input into the gesture recognition model to obtain a predicted number characterized by the sample gesture information.

Figure 4:
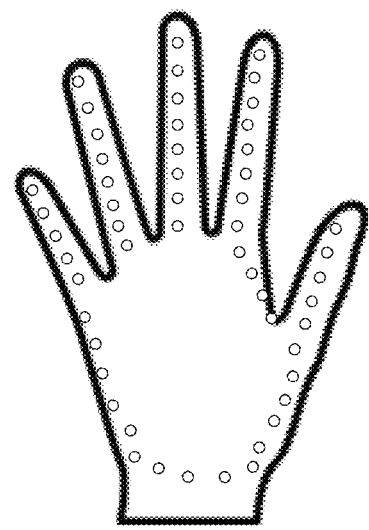
FIG. 4 is a schematic diagram of extracting feature points of a hand according to an example of the present disclosure.

For example, points corresponding to five fingers are extracted as feature points, as illustrated in FIG. 4. Optionally, the feature points in the sample gesture information are extracted as feature vectors which are extracted by the gesture recognition model, or by other models. Optionally, the feature vectors corresponding to the five feature points are input into the gesture recognition model to obtain the predicted number characterized by the sample gesture information; or, the gesture information is directly input to the gesture recognition model to obtain the predicted number characterized by the sample gesture information.

In step 3033, the gesture recognition model is trained by an error back propagation algorithm to obtain the trained gesture recognition model. The gesture recognition model may be trained and/or updated locally based on an initial model. Alternatively, the gesture recognition model may be trained and/or updated using servers in the cloud.

Optionally, an error between the predicted number characterized by the sample gesture information and an actual number characterized by the sample gesture information is calculated by an arbitrary loss function, and the gesture recognition model is trained according to the error.

In step 304, an n grid shooting mode corresponding to the number of n characterized by the gesture information is triggered when the gesture information is the gesture information characterizing the number, with n being an integer greater than zero.

When the gesture information is the gesture information characterizing the number, the chip in the terminal or in the device having the camera shooting function triggers the n grid shooting mode corresponding to the number of n characterized by the gesture information, with n being an integer greater than zero.

Figure 5:
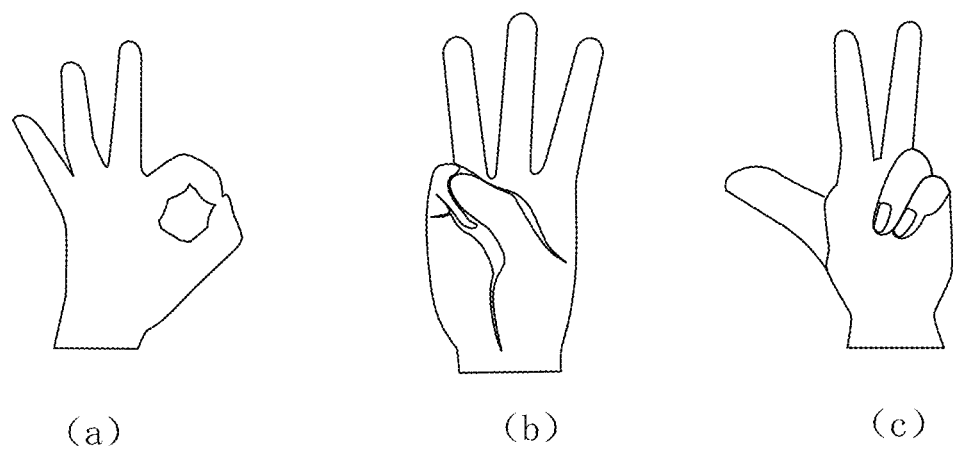
FIG. 5 is a schematic diagram of gesture information characterizing a number of three according to an example of the present disclosure.
Figure 6:
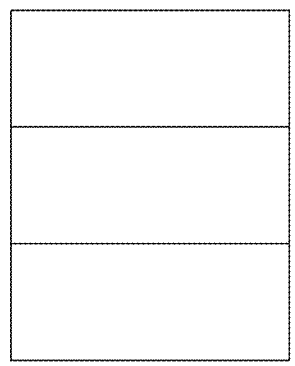
FIG. 6 is a schematic layout diagram of a three grid shooting preview image according to an example of the present disclosure.
Figure 6:
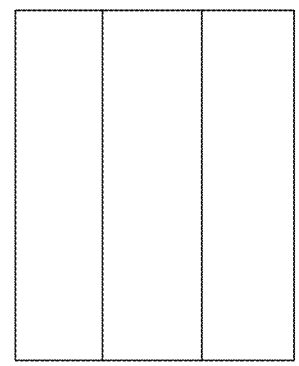
Figure 6:
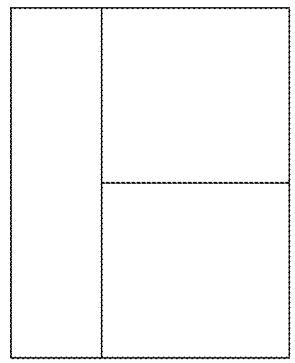
Figure 6:
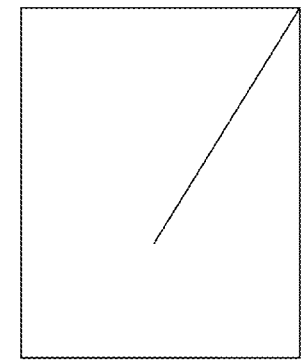

Optionally, the gesture recognition model may recognize the number of n characterized by the gesture information, and trigger the corresponding n grid shooting mode according to the number of n, or, directly trigger the corresponding n grid shooting mode according to the number of n characterized by the gesture information representations. As illustrated in FIG. 5, all the numbers characterized by (a), (b), and (c) in FIG. 5 are three. When recognizing that the gestures in the gesture information are the three gestures illustrated in FIG. 5, the gesture recognition model triggers a corresponding three grid shooting mode. Optionally, the three gird shooting mode corresponds to a shooting preview image divided horizontally, as illustrated in FIG. 6 (a); the three gird shooting mode corresponds to a shooting preview image divided vertically, as illustrated in FIG. 6 (b); the three gird shooting mode corresponds to a shooting preview image divided horizontally and vertically in combination, as illustrated in FIG. 6 (c); and the three grid shooting mode corresponds to a shooting preview image divided at an arbitrary angle, as illustrated in FIG. 6 (d). It can be understood that the shooting preview images above may be divided equally or unequally. In the embodiment of the present disclosure, the layout of the shooting preview image is illustrated using three as the number characterized by the gesture information by way of example, and the layout in this way is also applicable to the layout of the shooting preview image in the n grid shooting mode corresponding to n which is any integer greater than zero. There is no limit to the layout of the divided shooting preview image in the present disclosure.

Optionally, a four grid shooting mode corresponding to a number of four characterized by the gesture information is triggered when determining that the gesture information characterizes the number of four; or, a nine grid shooting mode corresponding to a number of nine characterized by the gesture information is triggered when determining that the gesture information characterizes the number of nine.

Figure 7:
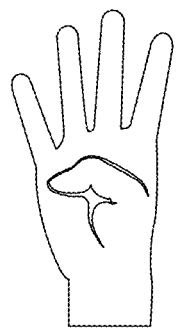
FIG. 7 is a schematic layout diagram of an n grid shooting preview image according to an example of the present disclosure.
Figure 7:
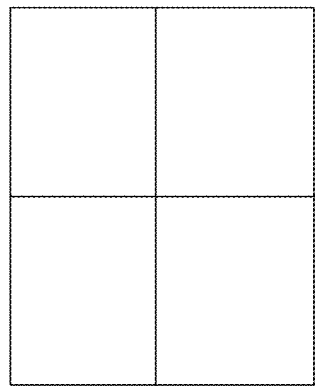
Figure 7:
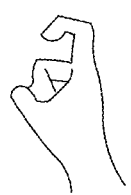
Figure 7:
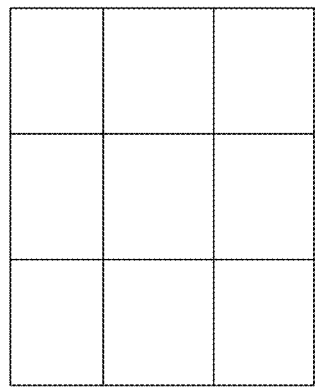

For example, when the user makes a gesture as illustrated in FIG. 7 (a) in front of the camera of the smart phone, a four grid shooting mode is triggered. A shooting preview image corresponding to the four grid shooting mode is shaped as a four grid, as illustrated in FIG. 7 (b). It can be understood that when the user makes the above gesture with the back of the hand facing the camera of the smart phone, the four grid shooting mode can also be triggered. Optionally, the gesture recognition model may recognize any gesture information characterizing or indicating the number of four, and the user may stretch out any fingers to characterize the number of four. For example, if the user stretches out four fingers other than the little finger to characterize the number of four, the four grid shooting mode may also be triggered.

For example, when the user makes a gesture as illustrated in FIG. 7 (c) in front of the camera of the smart phone, a nine grid shooting mode is triggered. A shooting preview image corresponding to the nine grid shooting mode is shaped as a nine grid, as illustrated in FIG. 7 (d). Optionally, when the user uses two hands to provide the gesture information characterizing a number of nine (for example, with one hand making a gesture characterizing a number of five and the other hand making a gesture characterizing a number of four), the nine grid shooting mode is also triggered.

Figure 8:
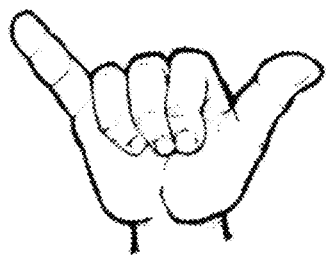
FIG. 8 is a schematic layout diagram of an n grid shooting preview image according to another example of the present disclosure.
Figure 8:
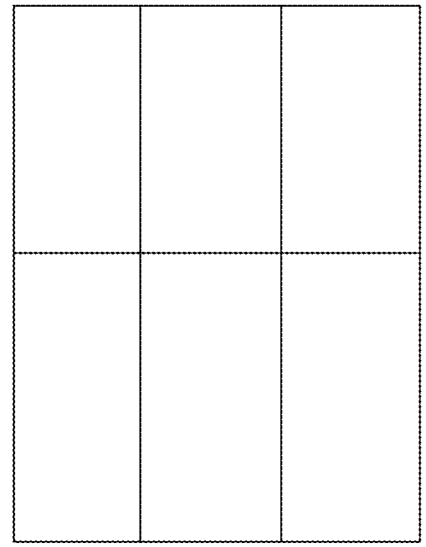
Figure 8:
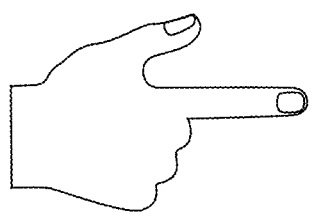
Figure 8:
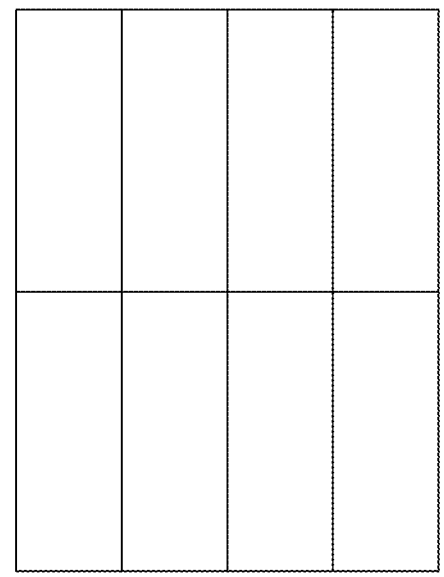

For example, when the user makes a gesture as illustrated in FIG. 8 (a) in the front of the camera of the smart phone, a six grid shooting mode is triggered, and a shooting preview image corresponding to the six grid shooting mode is shaped as a six grid, as illustrated in FIG. 8 (b). Optionally, when the user uses two hands to provide the gesture information characterizing a number of six (for example, with one hand making a gesture characterizing a number of five and the other hand making a gesture characterizing a number of one, or, with one hand making a gesture characterizing a number of three and the other hand making a gesture characterizing a number of three), the six grid shooting mode is also triggered.

For example, when the user makes a gesture as illustrated in FIG. 8 (a) in the front of the camera of the smart phone, an eight grid shooting mode is triggered, and a shooting preview image corresponding to the eight grid shooting mode is shaped as an eight grid, as illustrated in FIG. 8 (d). Optionally, when the user uses two hands to provide the gesture information characterizing a number of eight (for example, with one hand making a gesture characterizing a number of five and the other hand making a gesture characterizing a number of three, or, with one hand making a gesture characterizing a number of four and the other hand making a gesture characterizing a number of four), the eight grid shooting mode is also triggered.

The four grid shooting mode, the six grid shooting mode, the eight grid shooting mode, and the nine grid shooting mode provided in the embodiments of the present disclosure are optional n grid shooting modes. It can be understood that n is an integer greater than zero. When n is 1, a one grid shooting mode is triggered, that is, one shooting preview region is displayed on the shooting preview interface; when n is 3, a three grid shooting mode is triggered; when n is five, a five grid shooting mode is triggered; and when n is seven, a seven grid shooting mode is triggered. The principle of triggering the n grid shooting mode is the same and not be repeated here again.

In summary, according to the method provided in the embodiment, when the gesture recognition model is called to recognize the gesture information, the n grid shooting mode corresponding to the number of n characterized by the gesture information is triggered when the gesture information is the gesture information characterizing the number. Therefore, the user can switch the current shooting mode to the grid shooting mode without manually selecting the grid shooting mode, and the number of the grid corresponds to the number characterized by the gesture information, which enriches the shooting modes for the user and improves the efficiency of the man-machine interaction.

Figure 9:
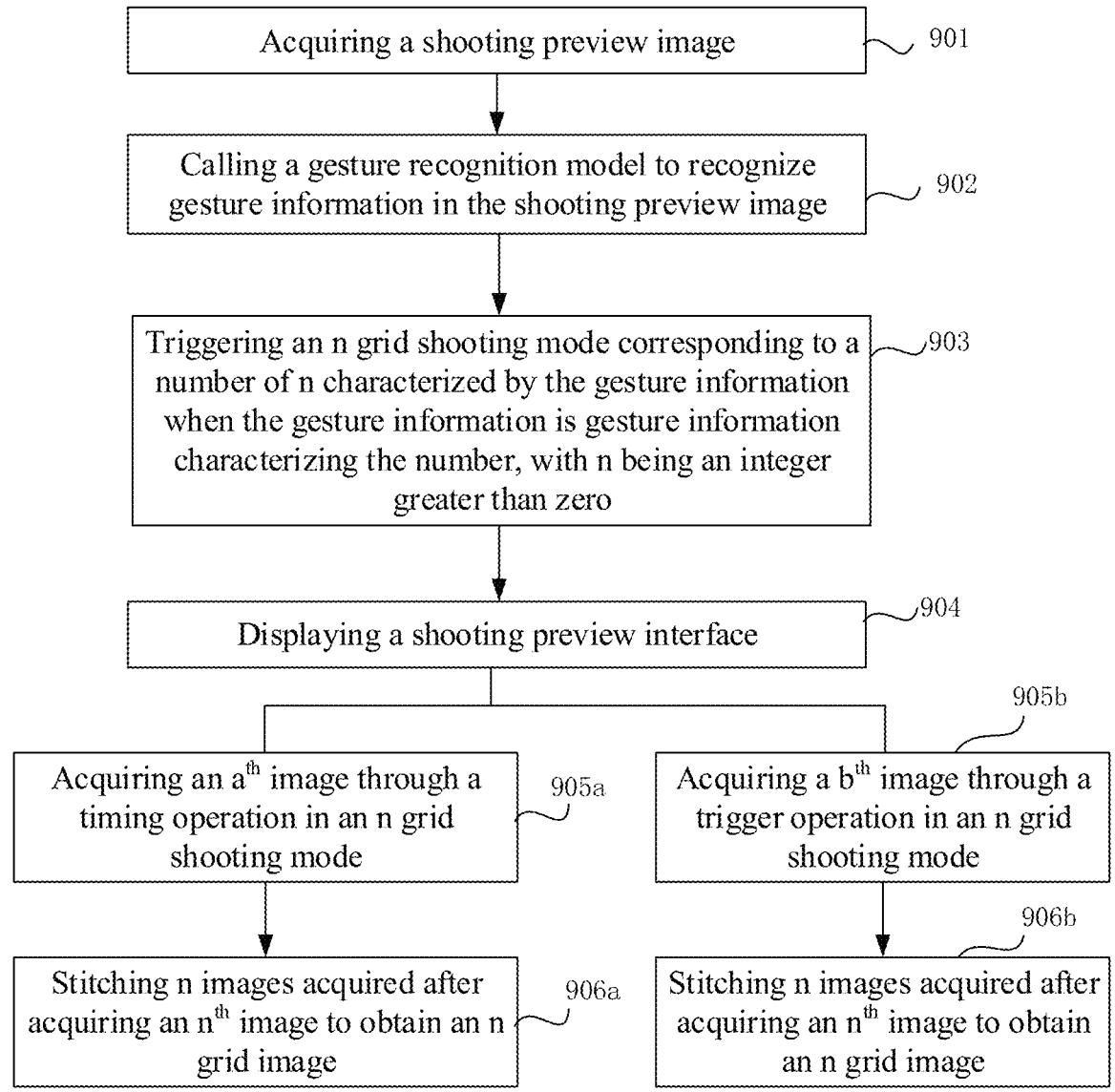
FIG. 9 is a flowchart of a method for triggering an n grid shooting mode according to an example of the present disclosure.

FIG. 9 illustrates a flowchart of a method for triggering an n grid shooting mode according to an example of the present disclosure. The method may be applied to an application supporting a camera shooting function in a terminal, or to a device having a camera shooting function. The method includes the following steps.

In step 901, a shooting preview image is acquired.

The application supporting the camera shooting function or the device having the camera shooting function acquires the shooting preview image.

In an example, the shooting preview image is acquired by a social application in the smart phone, and is acquired by the front camera of the smart phone called by the social application.

In step 902, a gesture recognition model is called to recognize gesture information in the shooting preview image.

A chip in the terminal or in the device having the camera shooting function calls the gesture recognition model to recognize the gesture information in the shooting preview image.

In step 903, an n grid shooting mode corresponding to the number of n characterized by the gesture information is triggered when the gesture information is the gesture information characterizing the number, with n being an integer greater than zero.

When the gesture information is the gesture information characterizing the number, the chip in the terminal or in the device having the camera shooting function triggers the n grid shooting mode corresponding to the number of n characterized by the gesture information, with n being an integer greater than zero.

In step 904, a shooting preview interface is displayed.

The shooting preview interface is displayed on the application supporting the camera shooting function in the terminal or on the device having the camera shooting function.

Optionally, the shooting preview interface includes n shooting regions corresponding to the n grid shooting mode, or the shooting preview interface includes a shooting preview region corresponding to an $i^{th}$ grid in the n grid shooting mode, with $0<i\le n$ and i being an integer.

For example, the description is made with n being 9 and i being 2. The shooting preview interface includes nine shooting regions corresponding to the nine grid shooting mode, as illustrated in FIG. 7 (b). Or, the shooting preview interface includes a shooting preview region corresponding to the second grid in the nine grids, that is, only one shooting preview region is displayed on the shooting preview interface. Optionally, the shape of the shooting preview region may be any shape such as a circle, a rectangle, a triangle, or a polygon, and the shape of the shooting preview region is not limited in the present disclosure. Optionally, when the shooting preview interface includes a shooting preview region corresponding to the $i^{th}$ grid in the n grid shooting mode, the displayed shooting preview regions may be the same or different. For example, the shapes of the first and second shooting preview regions are both rectangles; the shape of the third shooting preview region is a circle; the shape of the fourth shooting preview region is a triangle; and the shapes of the fifth to the ninth shooting preview regions are also rectangles.

Optionally, when the shooting preview interface includes n shooting preview regions corresponding to the n grid shooting mode, and when n>1, the shot images is displayed in first c−1 shooting preview regions of the n shooting preview regions when a $c^{th}$ image is shot in the n grid shooting mode, and the shooting preview image is displayed in a $c^{th}$ shooting preview region, with $0<c\le n$ and both c and n being integers.

Figure 10:
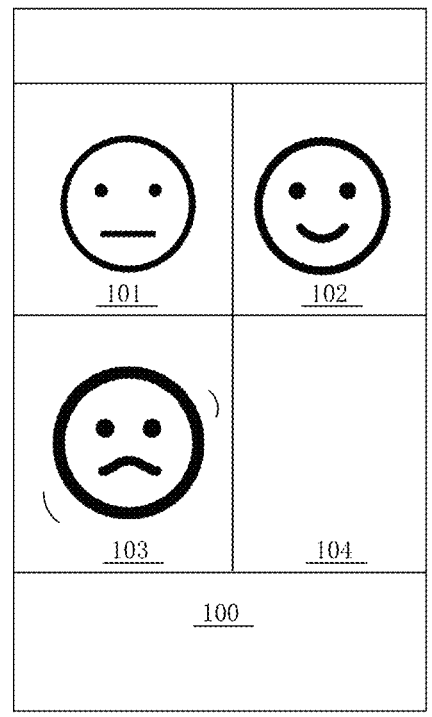
FIG. 10 is a schematic diagram of a shooting preview region according to an example of the present disclosure.

For example, the description is made with n being 4 and c being 3, as illustrated in FIG. 10. The shooting preview interface 100 includes four shooting preview regions corresponding to a four grid, which are a first shooting preview region 101, a second shooting preview region 102, a third shooting preview region 103, and a fourth shooting preview region 104. When the user shoots the third image, the shot images are displayed in the first two shooting preview regions (the first shooting preview region 101 and the second shooting preview region 102) of the four shooting preview regions, and the shooting preview image is displayed in the third shooting preview region (the third shooting preview region 103). Optionally, the shooting preview image is or is not displayed in the fourth shooting preview region 104; and the shooting preview image displayed in the fourth shooting preview region 104 is synchronous or asynchronous to the shooting preview image displayed in the third shooting preview region 103. For example, the fourth shooting preview region 104 is a black screen, without any shooting preview image displayed.

In step 905a, an $a^{th}$ image is acquired through a timing operation in an n grid shooting mode.

The camera acquires the $a^{th}$ image through the timing operation in the n grid shooting mode.

Optionally, the timing operation may be a countdown operation or a count-up operation.

When a is 1, a timing start time of the timing operation is a corresponding time when the gesture recognition model completes recognizing the gesture information; and when a>1, the start time of the timing operation is a corresponding time when acquiring an $(a-1)^{th}$ image is completed, and a is an integer greater than zero and less than n.

For example, with n being 4, the countdown operation is performed to describe the timing operation by way of example, as illustrated in FIG. 10. When a is 1, the timing start time of the countdown operation is the corresponding time when the gesture recognition model completes the gesture information recognition, i.e., the corresponding time when the four grid shooting mode is triggered. In one example, with a 3-second countdown, the first image is shoot after three seconds, that is, an image corresponding to the first shooting preview region 101 is acquired after three seconds. When a>1, the description is made with a being 3, the timing start time of the countdown operation is the corresponding time when the acquisition of the second image is completed, i.e. the corresponding time when the acquisition of the previous image is completed. Here, with the 3-second countdown, the corresponding time when the acquisition of the second image is completed is t2, and then the acquisition of a third image starts at a time t2+3.

Optionally, timing prompt information is displayed on the shooting preview interface or voice prompt information is set during a timing phase, which is not limited in the present disclosure.

In step 905b, a $b^{th}$ image is acquired through a trigger operation in the n grid shooting mode.

The camera acquires the $b^{th}$ image through the trigger operation in the n grid shooting mode.

The $b^{th}$ image is acquired after the trigger operation is received, that is, the user shoots an image at each trigger operation, with b being an integer greater than zero and less than n.

Optionally, a trigger control is or is not provided on the shooting preview interface. When the trigger control is provided on the shooting preview interface, the user may acquire an image by clicking the trigger control; and when the trigger control is not provided on the shooting preview interface, the user may acquire the image through a specific trigger operation, for example, by a double-clicking operation or a long-pressing operation. The trigger operation is not limited in the present disclosure.

Optionally, step 905a and step 905b may be implemented independently or in combination.

In step 906a, after an $n^{th}$ image is acquired, the n images acquired is stitched to obtain an n grid image.

The application supporting the camera shooting function in the terminal or the chip in the device having the camera shooting function stitches the n images acquired after acquiring the $n^{th}$ image, to obtain the n grid image.

Optionally, after the $n^{th}$ image is acquired, an n grid image that has been stitched may be directly displayed, or the n images acquired may be stitched by the trigger operation of the user. Optionally, the trigger operation of the user may be a trigger operation performed on the trigger control or a specific trigger operation (such as the double-clicking operation, the long-pressing operation, etc.).

Figure 11:
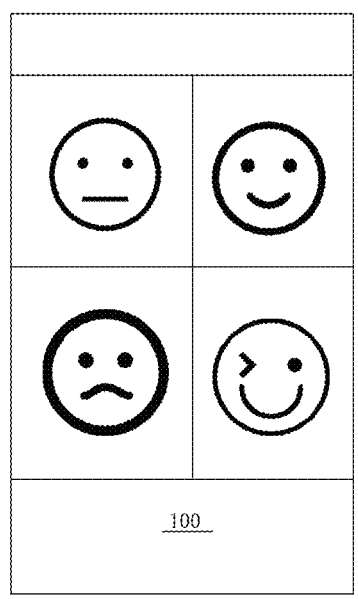
FIG. 11 is a schematic diagram of a four grid image in a four grid shooting mode according to an example of the present disclosure.
Figure 11:
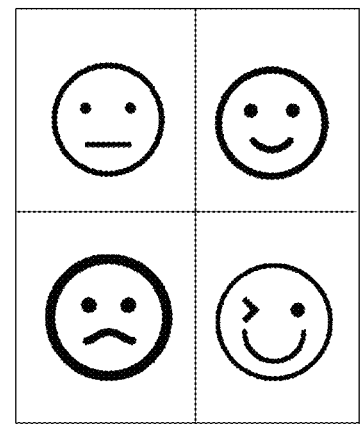

For example, the description is made with n being 4. As illustrated in FIG. 11(a), four images acquired are displayed on the shooting preview interface 100, and the user stitches the four images acquired by triggering a stitching control to obtain a four grid image 105 as illustrated in FIG. 11(b).

Figure 12:
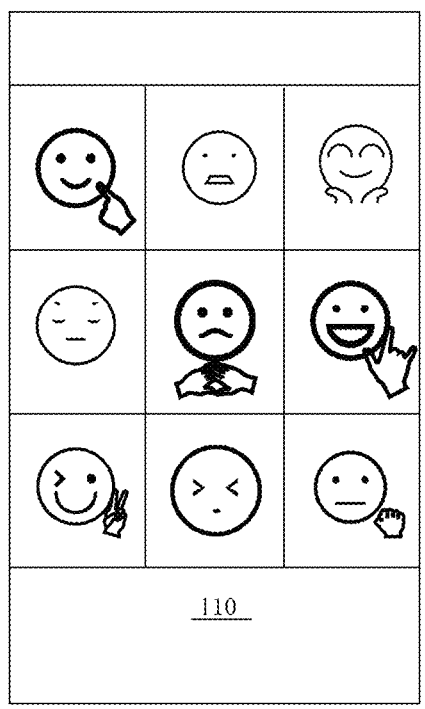
FIG. 12 is a schematic diagram of a nine grid image in a nine grid shooting mode according to an example of the present disclosure.
Figure 12:
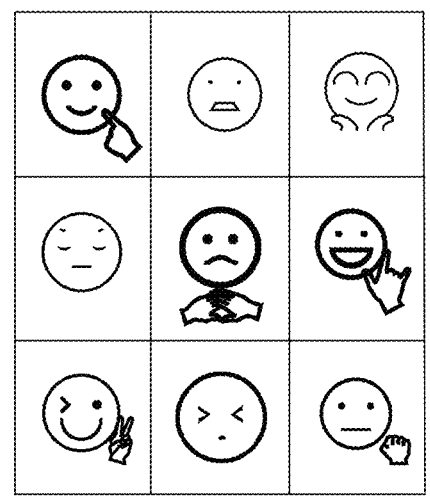

For example, the description is made with n being 9. As illustrated in FIG. 12(a), nine images acquired are displayed on the shooting preview interface 110, and the user stitches the nine images acquired by performing double-clicking operation to obtain a nine grid image 111 as illustrated in FIG. 12(b).

In step 906b, after an $n^{th}$ image is acquired, the n images acquired is stitched to obtain the n grid image.

The principle of step 906b is the same as that of step 906a, which is not repeated here again.

In summary, according to the method provided in the embodiment, recognizing the gesture made by the user via the gesture recognition model, triggering the n grid shooting mode corresponding to the number of n characterized by the gesture information, and acquiring the image through the timing operation or the trigger operation. Therefore, the user can acquire the image in the grid shooting mode without performing manual selection operation, which enriches the shooting modes for the user and improves the efficiency of the man-machine interaction.

Apparatus embodiments of the present disclosure are described in the following. For details that are not described in the apparatus embodiments, reference may be made to the corresponding description in the foregoing method embodiments, and the details are not described herein again.

Figure 13:
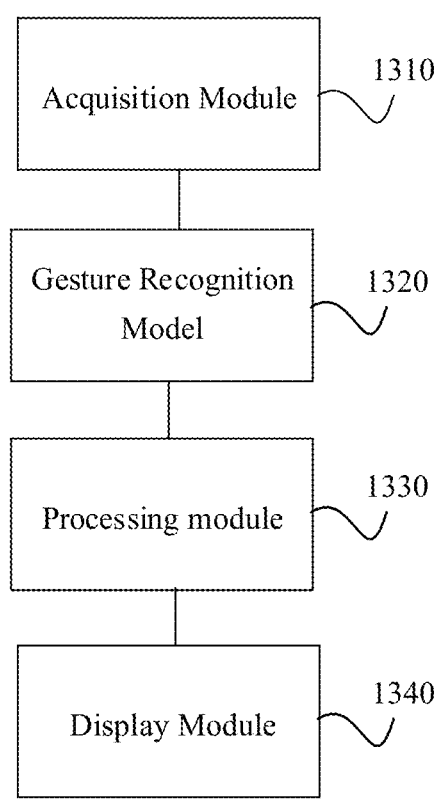
FIG. 13 is a block diagram of an apparatus for triggering a shooting mode according to an example of the present disclosure.

FIG. 13 illustrates a schematic structural diagram of an apparatus for triggering a shooting mode according to an example of the present disclosure. The apparatus may be implemented as all or part of a terminal through software, hardware, or a combination of both. The apparatus includes: an acquisition module 1310, a gesture recognition model 1320, and a processing module 1330.

The acquisition module 1310 is configured to acquire a shooting preview image.

The gesture recognition model 1320 is configured to recognize gesture information in the shooting preview image.

The processing module 1330 is configured to trigger a shooting mode corresponding to a number characterized by the gesture information when the gesture information is gesture information characterizing the number.

In an optional embodiment, the gesture recognition model 1320 is configured to recognize the gesture information in the shooting preview image. The gesture recognition model 1320 is a machine learning model with a gesture recognition capability.

The processing module 1330 is configured to trigger an n grid shooting mode corresponding to a number of n characterized by the gesture information when the gesture information is the gesture information characterizing the number, and n is an integer greater than zero.

In an optional embodiment, the processing module 1330 is configured to trigger a four grid shooting mode corresponding to a number of four characterized by the gesture information when determining that the gesture information characterizes or indicates the number of four; or, to trigger a nine grid shooting mode corresponding to a number of nine characterized by the gesture information when determining that the gesture information characterizes or indicates the number of nine.

In an optional embodiment, the acquisition module 1310 is configured to acquire an $a^{th}$ image through a timing operation in an n grid shooting mode; stitch the n images acquired after acquiring a $n^{th}$ image, to obtain an n grid image; or, the acquisition module 1310 is configured to acquire a $b^{th}$ image through a trigger operation in the n grid shooting mode, wherein the $b^{th}$ image is acquired after the trigger operation is received; and stitch the n images acquired after acquiring the $n^{th}$ image, to obtain the n grid image.

When a is 1, a timing start time of the timing operation is a corresponding time when the gesture recognition model completes recognizing the gesture information; and when a>1, the timing start time of the timing operation is a corresponding time when acquiring an $(a-1)^{th}$ image is completed, and both a and b are integers greater than zero and not greater than n.

In an optional embodiment, the apparatus includes a display module 1340.

The display module 1340 is configured to display a shooting preview interface, which includes n shooting preview regions corresponding to the n grid shooting mode, or includes a shooting preview region corresponding to an $i^{th}$ grid in the n grid shooting mode, with 0<i≤n and i being an integer.

In an optional embodiment, the display module 1340 is configured to: when n>1, display the shot images in first c−1 shooting preview regions of the n shooting preview regions when a $c^{th}$ image is shot in the n grid shooting mode, and display the shooting preview image in a ca shooting preview region, with 0<c≤n and both c and n being integers.

Figure 14:
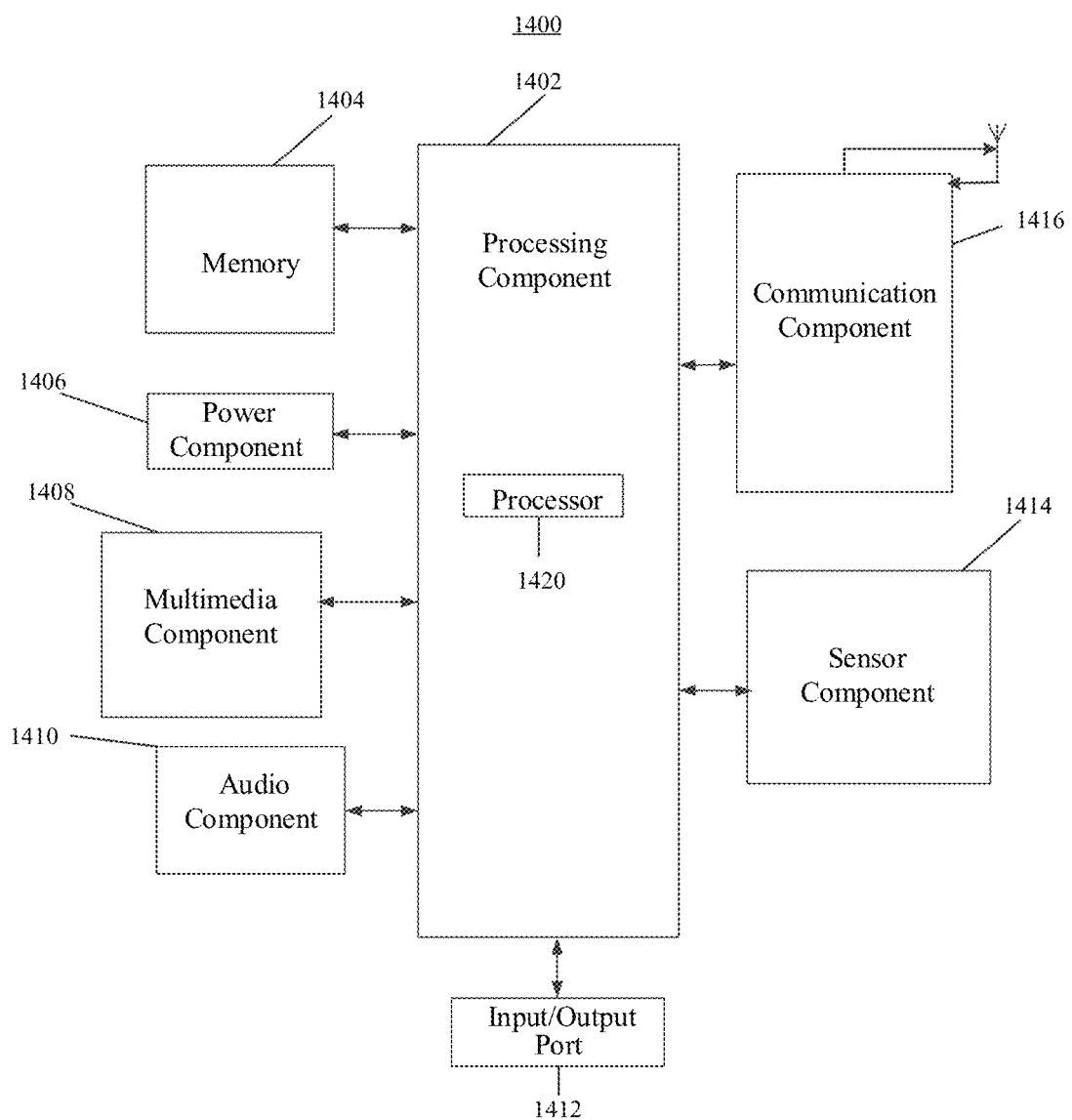
FIG. 14 is a device schematic structural diagram of a computer device according to an example of the present disclosure.

FIG. 14 is a block diagram of a computer device 1400 according to an example of the present disclosure. The computer device 1400 may be a mobile phone or a tablet computer. The computer device 1400 may also be called a user equipment, a mobile terminal, a portable terminal or the like.

A screen of the computer device includes a primary display region and an auxiliary display region which have different manufacturing attributes. An optical element is arranged below the auxiliary display region. The computer device 1400 may be a mobile phone, a tablet computer, an electronic book reader, a multimedia player, a wearable device, a portable laptop computer or other electronic devices.

Referring to FIG. 14, the computer device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the computer device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the computer device 1400. Examples of such data include instructions for any applications or methods operated on the computer device 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the computer device 1400. The power component 1406 may include a power management system, one or more power sources, and any other components associated with the generation, management, and distribution of power in the computer device 1400.

The multimedia component 1408 includes a screen providing an output interface between the computer device 1400 and the user. In some embodiments, the screen may include a liquid crystal display (LCD) and a touch panel (TP). In case that the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a front camera and/or a rear camera. The front camera and/or the rear camera may receive an external multimedia datum while the computer device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the computer device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the computer device 1400. For instance, the sensor component 1414 may detect an open/closed status of the computer device 1400, relative positioning of components, e.g., the display and the keypad, of the computer device 1400, a change in position of the computer device 1400 or a component of the computer device 1400, a presence or absence of user contact with the computer device 1400, an orientation or an acceleration/deceleration of the computer device 1400, and a change in temperature of the computer device 1400. The sensor component 1414 may include a proximity sensor configured to detect the presence of nearby objects without any physical contact. The sensor component 1414 may also include a light sensor, such as a complementary metal oxide semiconductor (CMOS) or charge-coupled device (CCD) image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the computer device 1400 and other devices. The computer device 1400 can access a wireless network based on a communication standard, such as Wi-Fi, 2G, 3G, 4G, 5G, or a subsequent evolution system, or a combination thereof. In one example, the communication component 1416 receives a broadcast signal or broadcast associated information from an external broadcast management system via a broadcast channel. In one example, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the computer device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components to execute the above method for triggering the shooting mode.

In examples, there is also provided a non-transitory computer readable storage medium storing a computer program. The computer program may be executed by the processor 1420 in the computer device 1400 to complete the above method for triggering the shooting mode. For example, the non-transitory computer-readable storage medium may be a ROM, a RAM, a CD-ROM, a magnetic tape, a floppy disc, an optical data storage device, or the like. It should be understood by those skilled in the art that the structure illustrated in FIG. 14 does not constitute a limitation to the computer device 1400, and may include more or less components than those illustrated, or combine some components or adopt different component arrangements.

In the present disclosure, there is also provided a computer device including a processor and a memory. The memory stores at least one instruction, at least one program, a code set, or an instruction set. The at least one instruction, the at least one program, the code set, or the instruction set can be loaded and executed by the processor to implement the method for triggering the shooting mode provided by the above method embodiments.

In the present disclosure, there is also provided a computer-readable storage medium which stores at least one instruction, at least one program, a code set, or an instruction set. The at least one instruction, the at least one program, the code set, or the instruction set can be loaded and executed by the processor to implement the method for triggering the shooting mode provided by the above method embodiments.

Understandably, the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A method for triggering a shooting mode, comprising:
   acquiring, by a terminal device comprising a camera, a shooting preview image;
   recognizing, by the terminal device, gesture information in the shooting preview image;
   triggering, in response to determining that the gesture information characterizes an integer number n, the shooting mode in the terminal device corresponding to the number n by determining the number n by calling a gesture recognition model to recognize the gesture information in the shooting preview image, wherein the gesture recognition model is a machine learning model with a gesture recognition capability; and triggering an n-grid shooting mode in the terminal device;
   acquiring an $a^{th}$ image through a timing operation in the n-grid shooting mode; and after acquiring an $n^{th}$ image, stitching n images acquired to obtain an n-grid image; and
   acquiring a $b^{th}$ image through a trigger operation in the n-grid shooting mode, wherein the $b^{th}$ image is acquired after the trigger operation is received; and after acquiring the $n^{th}$ image, stitching the n images acquired to obtain the n-grid image;
   wherein after acquiring the $n^{th}$ image, stitching the n images acquired to obtain the n-grid image comprises:
      after the $n^{th}$ image is acquired, directly displaying a n-grid image that has been stitched, or stitching the n images acquired by the trigger operation of the user; and
      when a is 1, a timing start time of the timing operation is a corresponding time when the gesture recognition model completes recognizing the gesture information; and when a is greater than 1, the timing start time of the timing operation is a corresponding time when acquiring an $(a-1)^{th}$ image is completed, wherein a is an integer greater than zero and not greater than n; wherein b is an integer greater than zero and not greater than n.

2. The method according to claim 1, wherein triggering the n-grid shooting mode comprises:
   triggering, in response to determining that n is 4, a four-grid shooting mode.

3. The method according to claim 1, wherein triggering the n-grid shooting mode comprises:
   triggering, in response to determining that n is 9, a nine-grid shooting mode.

4. The method according to claim 1, wherein after triggering the n-grid shooting mode, the method comprises:
   displaying a shooting preview interface, wherein the shooting preview interface comprises n shooting preview regions corresponding to the n-grid shooting mode, or the shooting preview interface comprises a shooting preview region corresponding to an $i^{th}$ grid in the n-grid shooting mode, wherein i is a positive integer not greater than n.

5. The method according to claim 4, wherein when the shooting preview interface comprises n shooting preview regions corresponding to the n-grid shooting mode, the method comprises:
   when n is greater than 1, displaying shot images in first c−1 shooting preview regions of the n shooting preview regions when a $c^{th}$ image is shot in the n-grid shooting mode, and displaying the shooting preview image in a $c^{th}$ shooting preview region, wherein c is a positive integer not greater than n.

6. A non-transitory computer-readable storage medium, wherein at least one instruction, at least one program, a code set or an instruction set is stored in the storage medium, the at least one instruction, the at least one program, the code set or the instruction set is loaded and executed by a processor to perform the method for triggering the shooting mode as defined in claim 1.

7. An apparatus for triggering a shooting mode, comprising:
- a processor;
- a camera controlled by the processor; and
- a memory for storing instructions executable by the processor;
- wherein the processor is configured to perform a method for triggering a shooting mode, wherein the method comprises:
- acquiring a shooting preview image captured by the camera;
- recognizing, by the terminal device, gesture information in the shooting preview image,
- triggering, in response to determining that the gesture information characterizes an integer number n, the shooting mode in the terminal device corresponding to the number n by determining the number n by calling a gesture recognition model to recognize the gesture information in the shooting preview image, wherein the gesture recognition model is a machine learning model with a gesture recognition capability; and triggering an n-grid shooting mode in the terminal device;
- acquiring an $a^{th}$ image through a timing operation in the n-grid shooting mode; and after acquiring an $n^{th}$ image, stitching n images acquired to obtain an n-grid image; and
- acquiring a $b^{th}$ image through a trigger operation in the n-grid shooting mode, wherein the $b^{th}$ image is acquired after the trigger operation is received; and after acquiring the $n^{th}$ image, stitching the n images acquired to obtain the n-grid image;
- wherein after acquiring the $n^{th}$ image, stitching the n images acquired to obtain the n-grid image comprises:
  - after the $n^{th}$ image is acquired, directly displaying a n-grid image that has been stitched, or stitching the n images acquired by the trigger operation of the user; and
    - when a is 1, a timing start time of the timing operation is a corresponding time when the gesture recognition model completes recognizing the gesture information; and when a is greater than 1, the timing start time of the timing operation is a corresponding time when acquiring an $(a-1)^{th}$ image is completed, wherein a is an integer greater than zero and not greater than n; wherein b is an integer greater than zero and not greater than n.

8. The apparatus according to claim 7, wherein triggering the n-grid shooting comprises:
- triggering, in response to determining that n is 4, a four-grid shooting mode.

9. The apparatus according to claim 7, wherein triggering the n-grid shooting comprises:
- triggering, in response to determining that n is 4, a nine-grid shooting mode.

10. The apparatus according to claim 7, wherein method further comprises:
- displaying a shooting preview interface, wherein the shooting preview interface comprises n shooting preview regions corresponding to the n-grid shooting mode, or, the shooting preview interface comprises a shooting preview region corresponding to an $i^{th}$ grid in the n-grid shooting mode, wherein i is a positive integer not greater than n.

11. The apparatus according to claim 10, wherein when the shooting preview interface comprises n shooting preview regions corresponding to the n-grid shooting mode, the method comprises:
- when n is greater than 1, display the shot images in first c−1 shooting preview regions of the n shooting preview regions when a $c^{th}$ image is shot in the n-grid shooting mode, and display the shooting preview image in a $c^{th}$ shooting preview region, wherein c is a positive integer not greater than n.

12. An electronic device, comprising a processor and a memory, wherein at least one instruction, at least one program, a code set or an instruction set is stored in the memory, the instruction, the program, the code set or the instruction set is loaded and executed by the processor to perform a method for triggering a shooting mode, wherein the method comprises:
- acquiring a shooting preview image;
- recognizing gesture information in the shooting preview image;
- triggering, in response to determining that the gesture information characterizes an integer number n, the shooting mode in the terminal device corresponding to the number n by determining the number n by calling a gesture recognition model to recognize the gesture information in the shooting preview image, wherein the gesture recognition model is a machine learning model with a gesture recognition capability; and triggering an n-grid shooting mode in the terminal device;
- acquiring an $a^{th}$ image through a timing operation in the n-grid shooting mode; and after acquiring an $n^{th}$ image, stitching n images acquired to obtain an n-grid image; and
- acquiring a $b^{th}$ image through a trigger operation in the n-grid shooting mode, wherein the $b^{th}$ image is acquired after the trigger operation is received; and after acquiring the $n^{th}$ image, stitching the n images acquired to obtain the n-grid image;
- wherein after acquiring the $n^{th}$ image, stitching the n images acquired to obtain the n-grid image comprises:
  - after the $n^{th}$ image is acquired, directly displaying a n-grid image that has been stitched, or stitching the n images acquired by the trigger operation of the user; and
    - when a is 1, a timing start time of the timing operation is a corresponding time when the gesture recognition model completes recognizing the gesture information; and when a is greater than 1, the timing start time of the timing operation is a corresponding time when acquiring an $(a-1)^{th}$ image is completed, wherein a is an integer greater than zero and not greater than n; wherein b is an integer greater than zero and not greater than n.

13. The electronic device according to claim 12, wherein triggering the n-grid shooting mode comprises:
- triggering, in response to determining that n is 4, a four-grid shooting mode.

* * * * *